Oct. 3, 1933.    B. A. FISKE    1,929,199
READING MACHINE
Filed Feb. 15, 1930    2 Sheets-Sheet 1
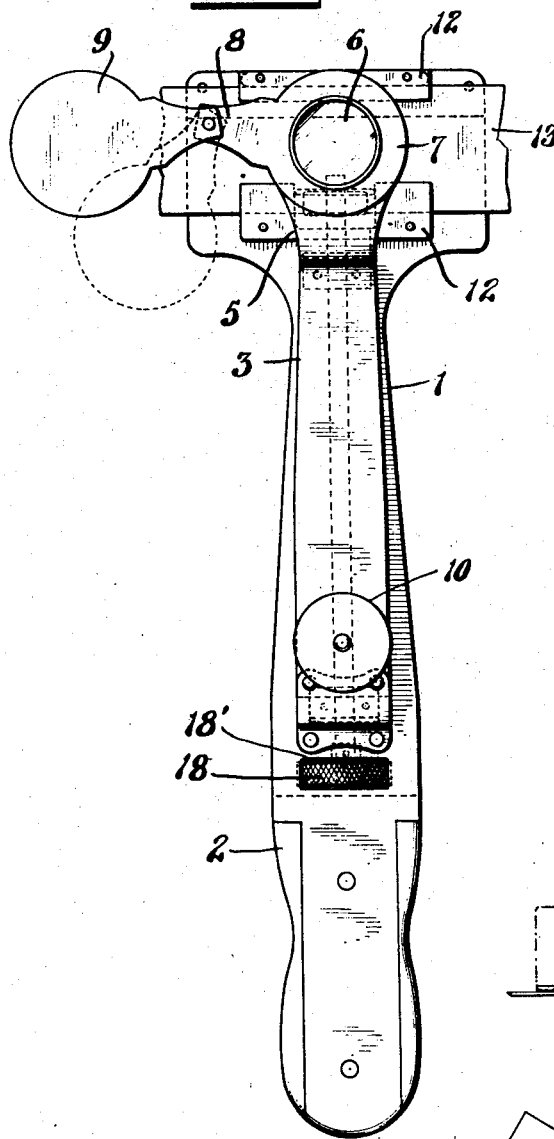
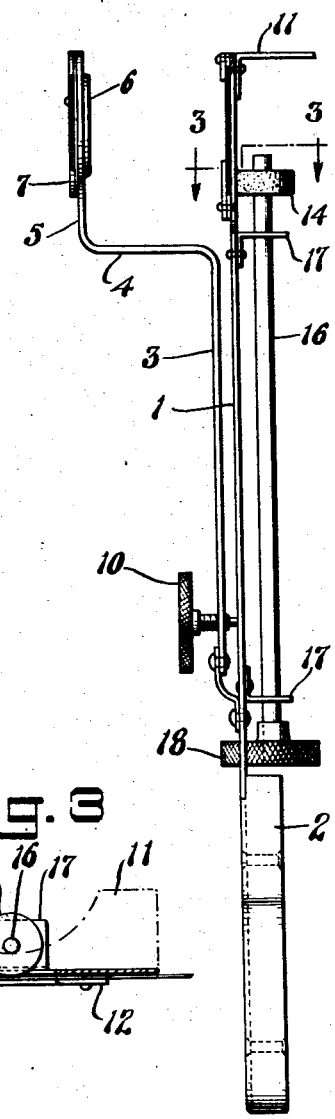
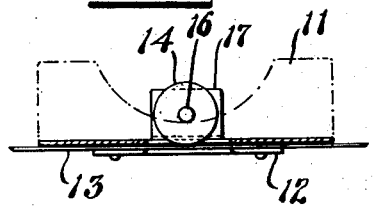
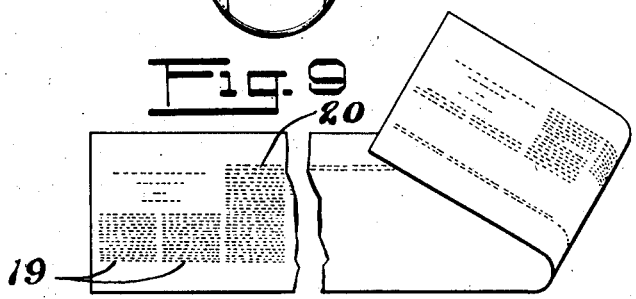
INVENTOR
Bradley A. Fiske
BY
ATTORNEY Oct. 3, 1933.   B. A. FISKE   1,929,199
READING MACHINE
Filed Feb. 15, 1930   2 Sheets-Sheet 2
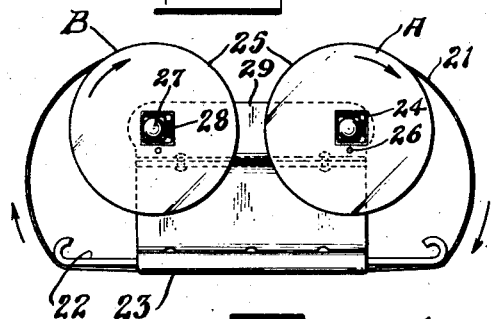
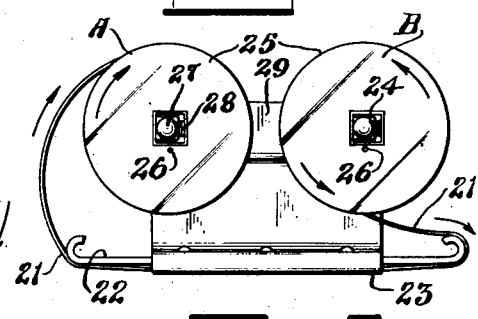
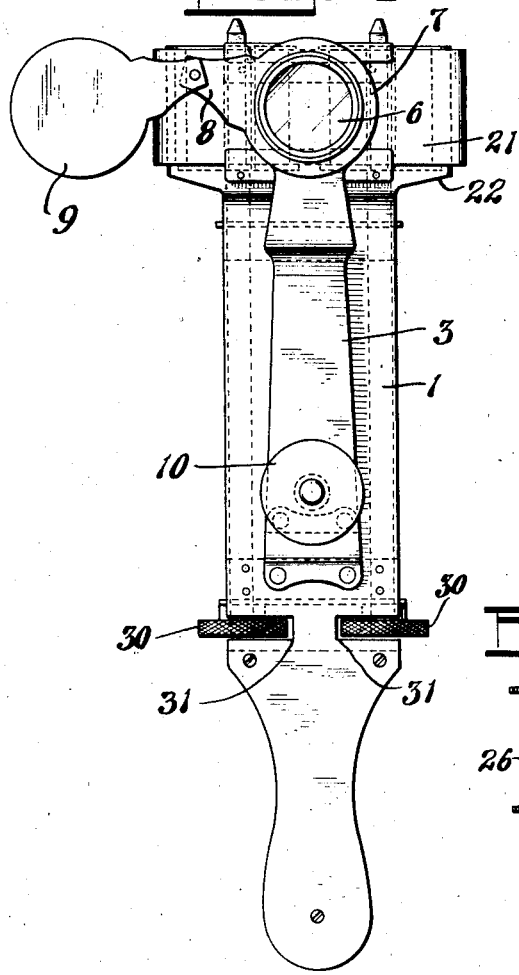
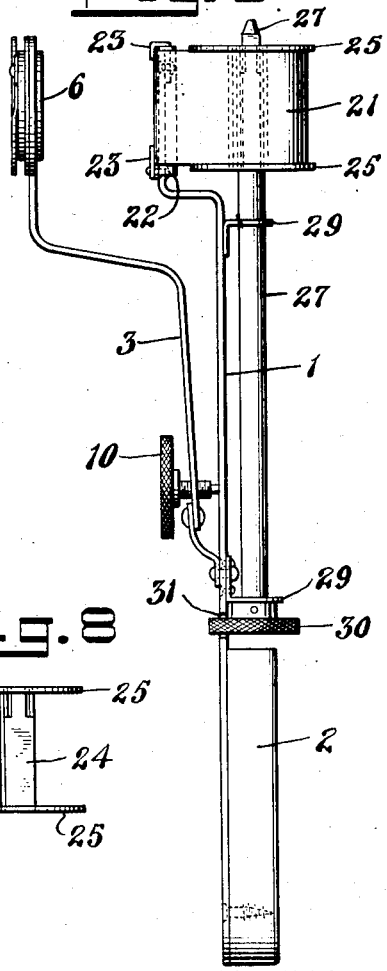
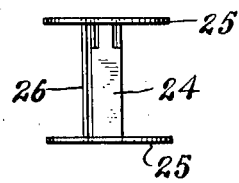
INVENTOR
Bradley A. Fiske
BY
Frank L. Dyer
ATTORNEY Patented Oct. 3, 1933

1,929,199

UNITED STATES PATENT OFFICE 1,929,199

READING MACHINE

Bradley A. Fiske, New York, N. Y.

Application February 15, 1930. Serial No. 428,683

3 Claims. (Cl. 88—39)

My invention relates to an improved reading machine, and my objects generally are to provide a machine capable of convenient and easy operation while being held in one hand, the reading matter being progressively moved, as will be hereinafter pointed out, by the thumb of the hand holding the machine. This makes the operation a very desirable one, as it permits the reader to use the machine while smoking. I will describe hereafter in detail two forms of the machine in which changes and modifications may be made by those skilled in the art falling within the scope of the claims to be hereinafter formulated.

With the preferred form of the invention a long, relatively narrow, tape is used, preferably carrying the reading matter in the form of microscopic characters arranged in columns or pages side by side, each column or page being sufficiently small as to be included within the field of the lens or lens system used, thus permitting each column or page to be read with the same facility and convenience as when a column or page of ordinary printed matter is read without the aid of a lens. After the reading of the column or page has been finished, the tape is moved by the thumb of the operator, so as to present the succeeding column or page within the field of the lens or lens system. With this form of my invention the tape is wound upon a spool from which it is unwound successively, being wound upon a second spool, and passing between the two spools through the field of the lens or lens system. Means are provided by which proper focussing of the lens or lens system may be effected, and when once this has been done, the successive pages or columns pass preferably sidewise across the field of view, so as to always be in proper focus.

Preferably the microscopic printed matter is carried upon both faces of the tape, and when this is done, it becomes possible to reverse the spools and permit the reverse side to be read without the necessity of rewinding the tape upon the spool from which it has been previously unwound. As an illustration of this form of my invention, I may make use of a tape having a width of about one inch, and a length of 200 inches. On said tape I carry the printed matter in the form of columns or pages one-half of an inch wide and one-half of an inch high. Such a column or page or micro page will hold about 125 words, so that there will be carried upon one side of a tape of these dimensions about 50,000 words, or approximately half the size of an average book. Therefore, upon both sides of the tape I am able to carry the contents of an average book. When the tape is fully wound upon one of the spools, the diameter can be conveniently made not to exceed 1½ inches and if the apparatus is made of duralumin, I find that its weight is only about seven ounces, which is much less than that of the average book.

In the second form of my invention, I do away with the spools and instead of using a long tape, I carry the microscopic printed matter in the form of micro pages, preferably side by side upon a shorter tape which is caused to progress with respect to the lens or lens system, so as to present the successive micro pages within the field of view. The tapes which I have thus used in practice have been about an inch in width and with a length of twenty-four inches, although, of course, these dimensions may be changed. Such a tape carrying printed matter in the form of micro pages ½ inch wide and ½ inch high will contain on both sides approximately 12,000 words, or the equivalent of sixteen pages of a standard American magazine. Eight of these tapes will represent a total of almost 100,000 words, or the contents of an average book. Such tapes may be carried in an envelope, from which they are removed as the matter thereon has been successively read. I find that it requires about forty minutes to read the 12,000 words on one of these tapes, so that the change from card to card is relatively infrequent and hence this scheme is entirely convenient and practical.

In order that the invention may be better understood, attention is directed to the accompanying drawings, forming a part hereof, and in which Figure 1 is a plan view of the second form of machine above referred to.

Figure 2 is a side view of same.

Figure 3 is a sectional view on the line 3—3 of Figure 2 looking in the direction of the arrows with the lens and its carrying arm and focussing screw removed.

Figure 4 is a front view of the preferred form of the machine.

Figure 5 is a side view of the same.

Figure 6 is a plan view illustrating the initial travel of the tape from the first spool to the second spool.

Figure 7 is a corresponding view showing the reverse travel of the tape from the second spool to the first spool.

Fig. 8 is a detailed elevation of one of the spools, and

Figure 9 a plan view of the tape illustrating the preferred arrangement on the two sides thereof.

In all of the above views corresponding parts are represented by the same numerals.

Referring first to the form of the device shown in Figures 1, 2 and 3, the main frame or support 1 is preferably of sheet duralumin, stiff enough for the purpose, and is secured at the lower end to a handle 2 of wood or other suitable material. Secured to the frame 1 is an arm 3 having a horizontal portion 4 and a vertical portion 5, the latter carrying the lens or lens system 6 of suitable power to permit the microscopic characters to be easily read, while at the same time including in the field of view the entire micropage hereafter specifically identified.

Rotatively mounted on the frame of the lens 6 is a ring 7 with sufficient friction to permit its being retained in any position of adjustment. This ring is provided with an arm 8 to which is pivoted a shield or blinder 9. Thus the device is intended to be used with one eye viewing the micropage through the lens 6, the blinder 9 being over the other eye. As shown in Figure 1, the right eye of the reader will do the reading, but by turning the ring 7 to an angle of almost 180 degrees, so as to reverse the position of the blinder 9, the left eye may do the reading. In use, the device will be held pressed against the forehead with the angular space between the arm 8 and blinder 9 resting upon and supported by the upper part of the nose. This makes the device easy to operate and part of its weight, though slight it may be, is taken off the hand.

An adjusting screw 10 passes through the arm 3 and engages the support 1, whereby the lens may be adjusted back or forth, to secure focussing. I show a ledge 11 at the upper edge of the frame 1, (shown also in dotted lines, Figure 3), which acts to stiffen the frame and also as a support for the device when it is laid on a table out of use. The frame also carries two guide strips 12—12 for guiding the tape 13 on which is printed the reading matter. Thus the tape will be movable across the field of the lens and will be always kept flat and unbuckled, so that the reading matter will remain in focus. In order to feed the tape sidewise, I illustrate a friction wheel 14, which engages the back of the tape through an opening 15 in the frame 1. This friction wheel may be made of rubber or some suitable material for frictionally engaging the back of the tape, or it may be of metal with a knurled or roughened surface. The wheel is shown as being carried by shaft 16, mounted in two bearings, 17, 17, carrying at its lower end a knurled wheel 18 extending through an opening 19 in the frame 1, as shown particularly in Figure 1. The portion of the wheel 18 projecting through this opening will be conveniently located to be operated by the thumb of the reader.

In Figure 9, I show both sides of a tape having micro pages thereon. 19 and 20 illustrate such micro pages, the former being shown as somewhat shorter than the latter, to make room for suitable titles or chapter headings. These micro pages are sufficiently small to be encompassed by the field of the lens, and as I have indicated above a convenient size is ½ of an inch wide by ½ of an inch high. With such a micro page, the printing may be sufficiently microscopic as to allow approximately 125 words to be carried on a page.

Referring now to the preferred form of machine shown in Figures 4 to 9 inclusive, the frame 1, the handle 2, lens arm 3, lens 6, ring 7, shield or blinder 9 and adjusting or focussing screw 10 are substantially the same as in the first form of the device. With this arrangement two spools A and B are used. These spools are identical, but are given different reference characters in order to make clearer an understanding of the operation, when the spools are reversed and it is desired to read the micro pages on the back of the tape. As shown in Figure 6, the tape 21 is supposed to be carried on the spool A and be wound therefrom on to the spool B, the tape and spools moving in the direction of the arrows. In this travel, the tape passes over and in contact with a bridge 22 being guided by the lugs 23 so that it will be held perfectly flat in the field of the lens at all times. Preferably each spool comprises a core 24 square in cross section (see Figures 6 and 7) and to which core the heads 25 are secured in any suitable way. At the side of one of the faces of each core 24 and almost in contact therewith is a small vertical bar 26 whereby the end of the tape may be inserted between said bar and the core, so as to hold the tape while it is being wound up on the spool. The core 24 being square in cross section, the innermost convolution of the tape curves around the corners thereof and will be clear of the bar 26. Each spool is removable, mounted on a shaft 27 having a squared upper end 28, fitting within the hollow core of the corresponding spool. Each shaft is mounted in bearings 29 on the support 1, and has a knurled wheel 30 at its lower ends, extending through slots 31 in the frame 1, whereby either shaft may be operated by the thumb of the reader.

Referring now to Figure 9, it is to be observed that the tape is shown as being broken away at the center so that only its two ends are illustrated. The reading on the front in the form of micro pages as heretofore explained, appears with its commencement at the left hand edge of the tape; the reading on the back of the tape commences at the right hand end of the tape, the reason for which will be now explained.

Referring first to Figure 6, it will be understood that the tape is moved from spool A to spool B, or in other words, from right to left. It will be moved successively after each micro page is read until finally the entire tape will be wound on spool B, except the short portion leading from spool A. The spools are now removed from the shafts 27 and their positions are reversed as shown in Figure 7. The tape is then run across the bridge 22 as shown in Figure 7, with the former back face thereof exposed to the lens, and that reading matter will now appear in proper position. The micro pages that were on the back of the tape are now read in the same way, the tape passing from right to left and being wound off the spool B and on to the spool A. I show in Figures 4 and 5 two shafts 27 with knurled knobs for rotating them, so as to make either spool operate if the tape is of such a character as to require such operation. Ordinarily, however, it is only necessary to employ one of the shafts.

In the appended claims where reference is made to a lens, it includes not only a simple lens of the type illustrated in the drawings, but ony lens system by which the reading matter may be observed and deciphered by one or both eyes of the reader. Also where reference is made in the claims to a tape without other limitations or qualifications, I include a short tape carrying micro pages of the type described in connection with the first form of my device.

Having now described my invention, what I claim is new therein and desire to secure by Letters Patent is as follows:

1. In a reading machine the combination with a lens, two spools, a tape carrying reading matter arranged in columns or micro pages, said columns being sufficiently small as to be comprehended within the field of view of said lens said tape being mounted upon one spool and adapted to be unwound therefrom on to the other spool, and a bridge between the spools and in contact with which the tape passes so as to move in a fixed focal plane with respect to the lens.

2. A reading machine comprising a lens, two parallel shafts, a spool mounted upon each of said shafts, and removable therefrom, and a tape carrying on both sides printed matter in the form of micro pages arranged side by side whereby the printed matter on one side of the tape may be read as the tape passes in one direction past the field of the lens and by reversing said spools on the shafts the printed matter on the other side may be read as the tape passes in the same direction with respect to the lens.

3. In a reading machine, the combination of a lens, a tape carrying printed matter in the form of micro pages arranged side by side, said pages being sufficiently small as to be comprehended within the field of said lens, a thumb wheel adapted to be operated by the thumb of the hand which controls the machine, a shaft leading from and operated by said thumb wheel and connections between said shaft and the tape for moving the latter sidewise across the field of the lens.

BRADLEY A. FISKE.